United States Patent [19]
Lubinec

[11] 3,972,603
[45] Aug. 3, 1976

[54] AUTOMATIC PROMPTER

[76] Inventor: William Lubinec, 22 Cornish Ave., Hillcrest, Binghamton, N.Y. 13901

[22] Filed: Apr. 22, 1974

[21] Appl. No.: 462,732

Related U.S. Application Data
[63] Continuation-in-part of Ser. No. 292,853, Sept. 28, 1972, abandoned.

[52] U.S. Cl. ................................ 352/4; 179/1 VC; 179/1 AT; 179/100.1 VC
[51] Int. Cl.² ........................................ G11B 15/18
[58] Field of Search ................ 352/4; 40/28.3, 28.1; 197/181.1, 181.2; 307/116, 117; 318/460; 317/141 R; 340/148; 179/1 VC, 1 AT, 100.1 VC; 178/DIG. 30

[56] References Cited
UNITED STATES PATENTS

| | | | |
|---|---|---|---|
| 2,291,931 | 8/1942 | Troeger | 353/78 |
| 2,487,242 | 11/1949 | Holland | 352/4 |
| 2,512,828 | 6/1950 | Collins | 352/4 |
| 3,748,496 | 7/1973 | Hedin | 307/252 W |
| 3,829,621 | 8/1974 | Goldman | 179/100.1 R |

FOREIGN PATENTS OR APPLICATIONS

| | | | |
|---|---|---|---|
| 721,259 | 12/1931 | France | 352/4 |

*Primary Examiner*—Kathleen H. Claffy
*Assistant Examiner*—C. T. Bartz
*Attorney, Agent, or Firm*—Wilbur J. Kupfrian; George W. Shaw

[57] ABSTRACT

An automatic prompter uses a script written on a paper-supply roll that is fed across a reading region and coiled in a takeup roll, and a motor drives the feed mechanism in pace with the speaker reading the script. A microphone picks up the speaker's speech, and electronic circuitry amplifies the speech and detects the portion of the speech that exceeds a threshold. Switching circuitry energizes the motor whenever the speech is above the threshold and de-energizes the motor whenever the speech is not above the threshold. The drive train, including the motor and the feed roller, has mechanical inertia that cooperates with the switching circuitry so that the motor increases speed during energization up to a maximum limit and decreases speed after de-energization to provide an average speed as a function of the portion of the total time of a given interval that the energization occurs.

10 Claims, 8 Drawing Figures

AUTOMATIC PROMPTER

RELATED APPLICATIONS

This is a Continuation-In-Part of my parent application, Ser. No. 292,853, filed Sept. 28, 1972, entitled AUTOMATIC PROMPTER and abandoned upon filing of this Continuation-In-Part application.

THE INVENTIVE IMPROVEMENT

Teleprompters and other prompting equipment are generally known but often require operation by the speaker or an assistant, thus presenting an additional distraction to the speaker. A separate operator for a prompter adds greatly to the expense, and as yet, no simple, compact, and automatic prompter is available on the market.

The invention involves recognition of these shortcomings of existing prompting equipment and suggests a simple, reliable, compact, economical prompter that automatically operates at the speaker's pace. The invention aims at a prompter that is automatic, easily operated, portable, and usable in a wide variety of circumstances.

SUMMARY OF THE INVENTION

The inventive automatic prompter uses a supply or pay off roll such as a paper tape inscribed with a suitable script that is fed across a reading region and coiled into a takeup roll by a motor driving a feed mechanism. A microphone picks up the speech of the speaker, and electronic circuitry responsive to the microphone amplifies the speech and detects the portion of the speech that is above a predetermined threshold. Switchng means responsive to the electronic circuitry energizes the motor to switching a feed roller whenever the speech is above the threshold and de-energizes the motor whenever the speech is not above the threshold. The drive train, including the motor, feed roller, and paper, has mechanical inertia cooperating with the switching means so that the motor increases speed during energization up to a maximum limit and decreases speed after de-energization to provide an average speed as a function of the portion of the total time of a given interval that the energization occurs. The device also includes a motor stop-and-start control and a motor maximum-speed control operable by the speaker.

DRAWINGS

DETAILED DESCRIPTION

Figure 1:
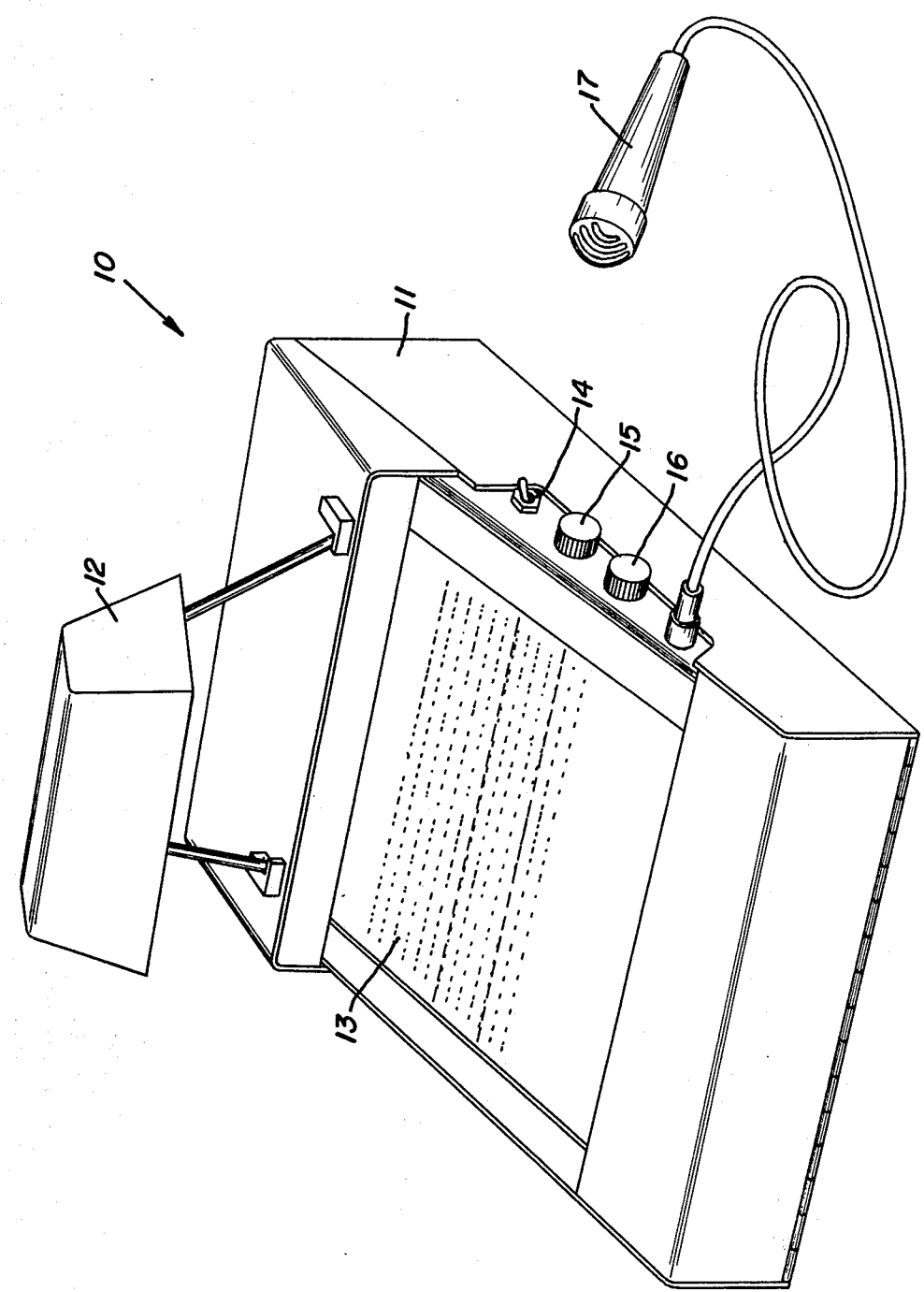
FIG. 1 is a perspective view of a preferred embodiment of the inventive prompter.

Prompter 10 of FIG. 1 has a small, portable housing 11 having a lamp 12 and means for feeding script-bearing paper 13 so that a speaker can read the script in making the speech. Housing 11 is preferably sized to fit any lectern so that prompter 10 is usable both for television and speaker. speeches are made.

Controls available to the speaker include an on/off switch 14, a maximum speed adjustment knob 15, and a sensitivity adjustment knob 16. A microphone 17 picks up the speaker's speech and is preferably directional to exclude audience and other noises so as to respond substantially only to the speech of the speaker Microphone 17 can be hand held or free standing, or positioned within housing 11 as desired.

Figure 2:
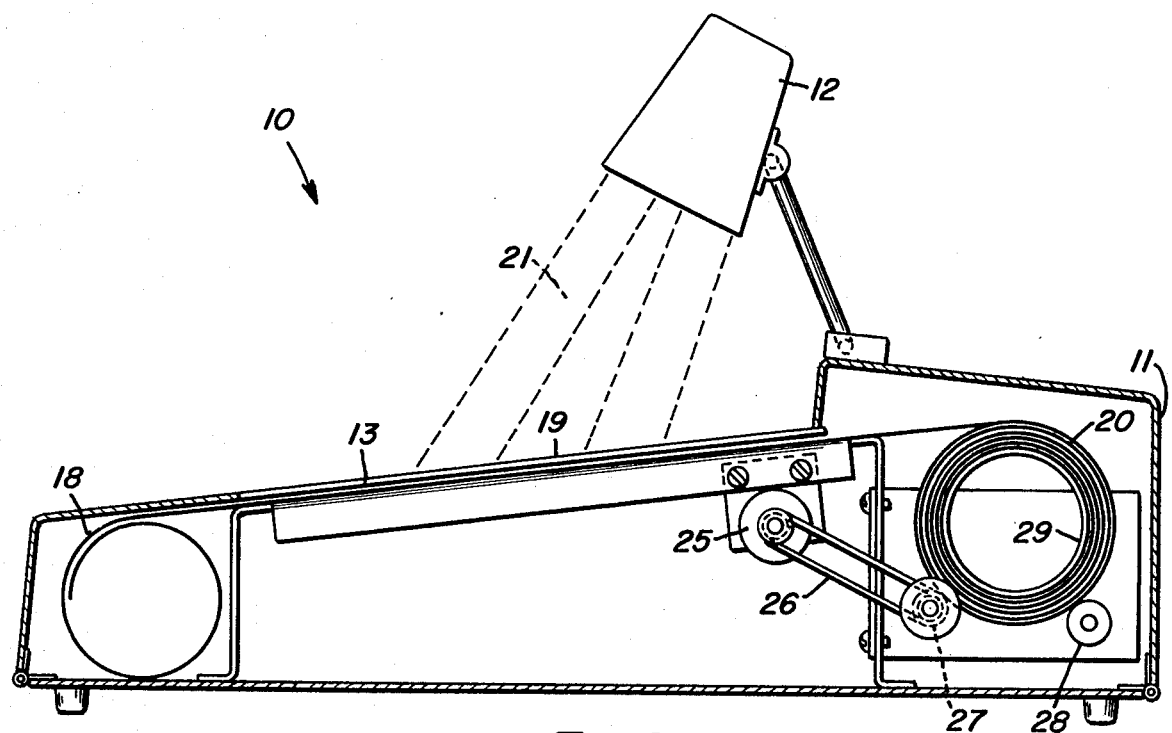
FIG. 2 is a partially cut away, elevational view of the prompter of FIG. 1.
Figure 3:
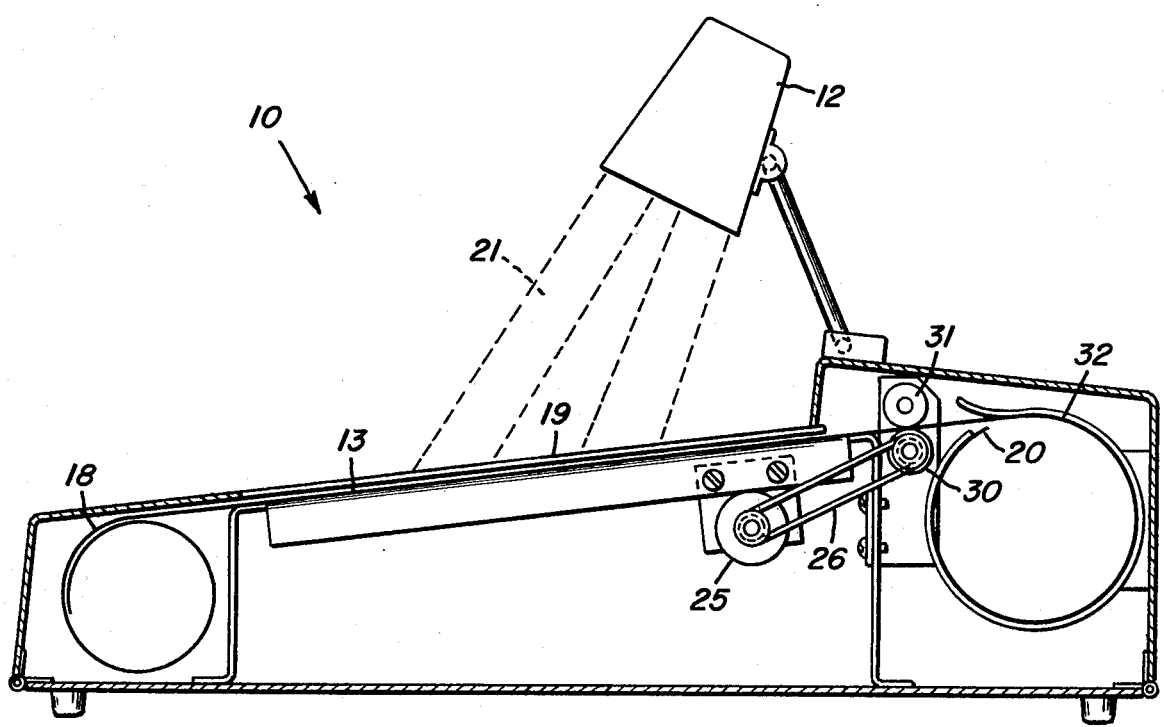
FIG. 3 is a partially cut away, elevational view of an alternative script feeder for the prompter of FIG. 1.

Preferred mechanical drives for advancing paper script 13 are best shown in FIGS. 2 and 3. Script 13 is written or typed on paper that preferably is wound into a supply roll 18 so that script 13 can be fed from a pay-off area or supply zone (containing such roll) across a window area (best seen in FIG. 1) that is clearly visible to the speaker, and which includes a reading region 19. Supply roll 18 is preferably at the bottom of housing 11 so that script 13 feeds upward toward a takeup roll 20 which lets the speaker read downward in the usual way at reading region 19. Lamp 12 preferably directs a somewhat broad light beam 21, but includes a more brightly illuminated central narrow band or region 19 highlighting a reading zone, such as a few lines of script 13 as outlined in FIG. 1 to help mark the speaker's place.

The differences between FIGS. 2 and 3 relate to different drive means for advancing script 13 into takeup roll 20. Each drive uses a motor 25 and a drive belt 26 leading to a driven roller. The driven roller 27 of FIG. 2 engages and drives the periphery of takeup roll 20 with a friction surface. Roll 20 is supported by low-friction idler rollers 28 and by friction drive roll 27, and script paper or tape 13 is relatively long and wound up on hollow core 29. As roller 27 turns in response to motor 25, script 13 winds up at the linear speed of drive roller 27. Driven roller 30 of FIG. 3 is opposite a pressure roller 31 so that script paper 13 is squeezed and pushed between rolls 30 and 31 at the linear rate of roller 30 as motor 25 turns. Guide strips 32 guide script 13 into a takeup coil 20 as illustrated. The drive of FIG. 3 is preferred for relatively short scripts, and the drive of FIG. 2 is preferred for relatively long scripts.

Figure 4:
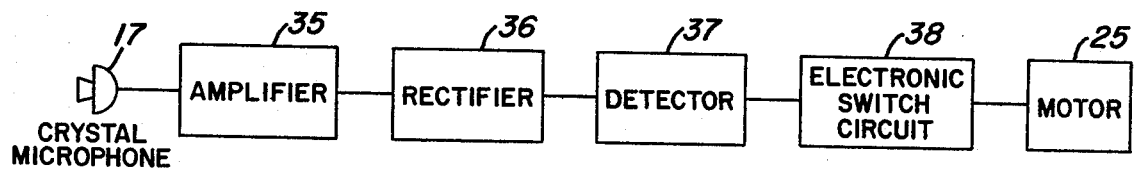
FIG. 4 is a schematic diagram of the electrical components of the prompter of FIG. 1.
Figure 5:
FIG. 5 is a schematic view of the operation of the components of FIG. 4.
Figure 5:
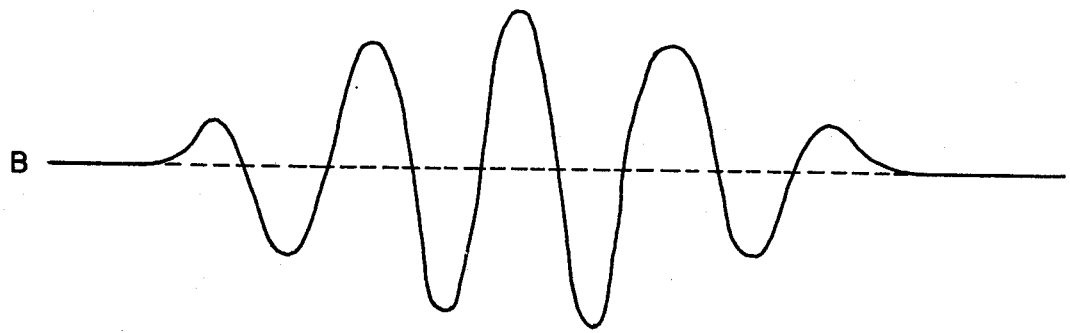
Figure 5:
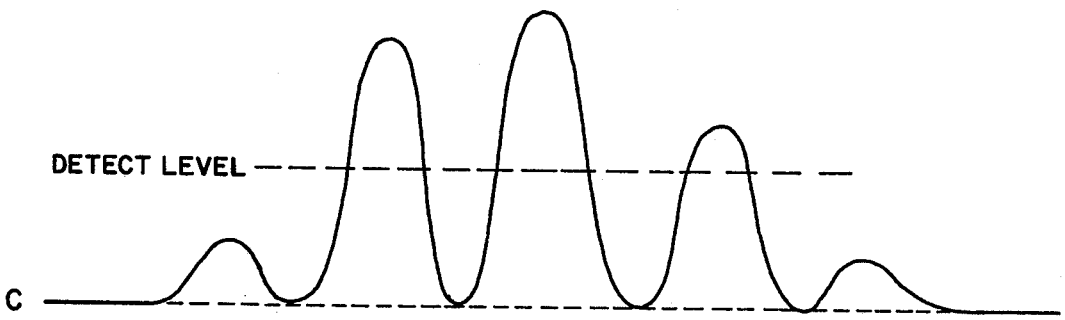
Figure 5:
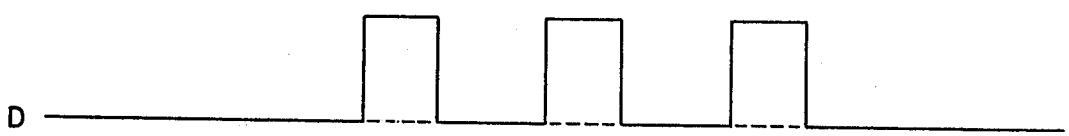
Figure 5:
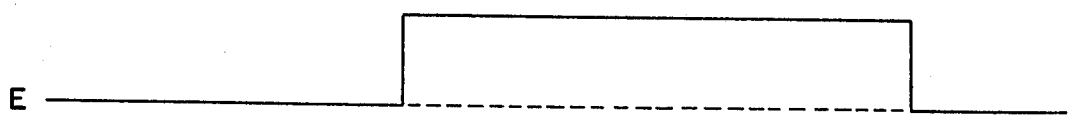
Figure 8:
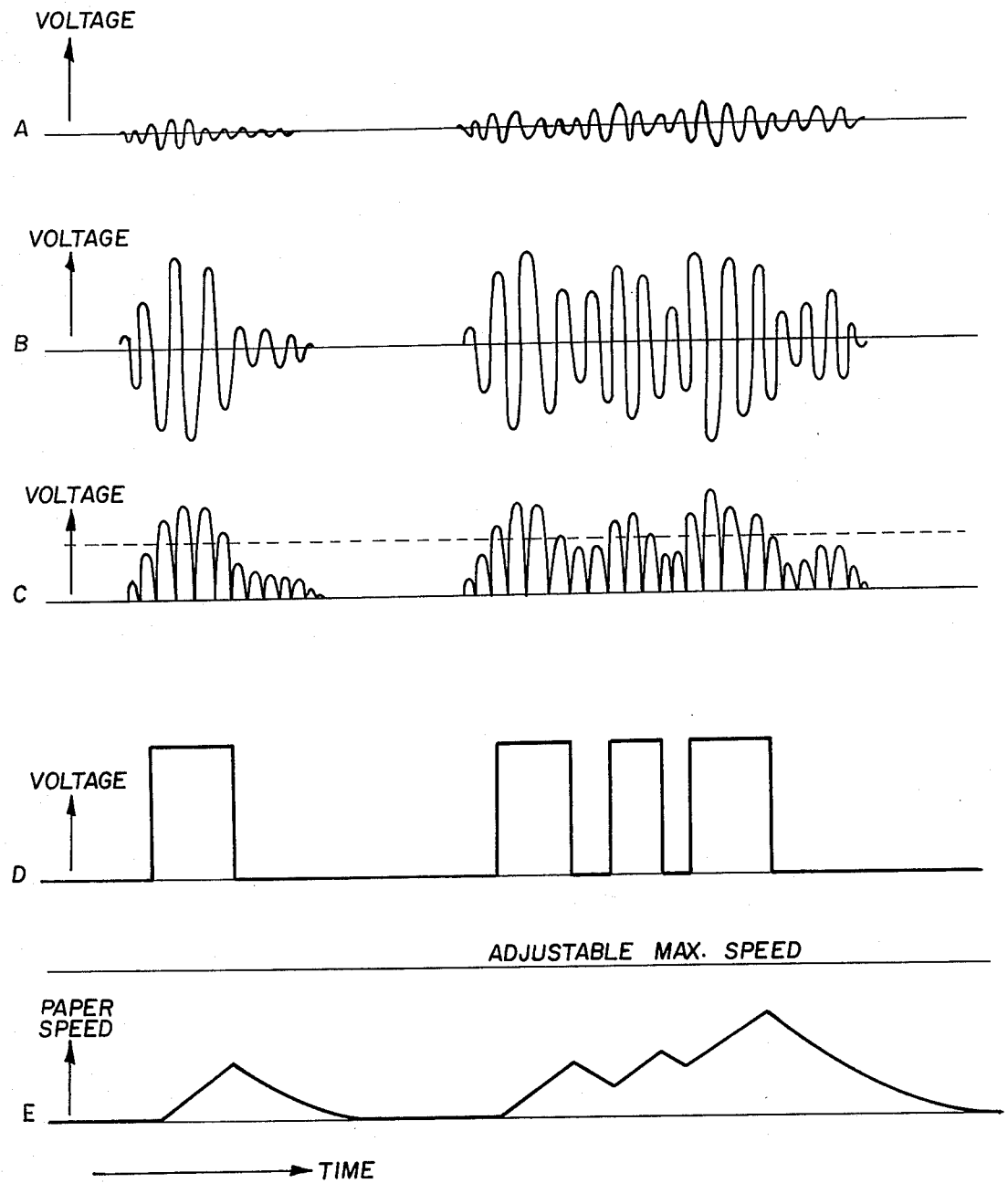
FIG. 8 is a schematic view similar to FIG. 5 and better showing the operation of the inventive device.

The electrical operation of the inventive prompter is shown schematically in FIG. 4, and its operation is best illustrated schematically in FIG. 8. The application as originally filed contained some misconceptions on the actual operation of the inventive prompter, and although the construction, circuitry, and actual operation of the inventive prompter has remained the same in reality from before the filing of the original application to the filing of the continuation-in-part application, the explanation of the operation was erroneous in some details, and is clarified in this continuation-in-part application. New FIG. 8 is preferred over previous FIG. 5 for correctly showing the operation of the invention.

Referring to FIGS. 4 and 8, microphone 17 generates a signal voltage analogous to the speech of the speaker, and an example of the output signal of microphone 17 is shown at FIG. 8A. This signal is sent to amplifier 35 to produce a larger voltage signal such as shown at 8B.

The amplified signal is rectified by a rectifier 36 to cause the AC portion of the voltage to be all on the same side with reference to the initial DC level as shown in 8C. The rectified signal is fed to detector 37 which preferably has an adjustable threshold so that detector 37 detects only the portion of the signal voltage that exceeds the detect level, and the output from detector 37 is fed to electronic switching circuit 38 to produce a switching pattern as shown at FIG. 8D. The output of FIG. 8D from switching circuit 38 is applied to DC motor 25 which operates as shown in FIG. 8E.

Motor 25 preferably has an adjustable maximum speed at an upper limit as indicated schematically in FIG. 8E, and the drive train including motor 25, drive belt 26, a drive roller, and the paper script 13 has a mechanical inertia that cooperates with switching circuit 38 and integrates the speech of the speaker. At the beginning of any "on" pulse, motor 25 is energized and accelerates toward its adjusted maximum speed, but if the speech sounds from the speaker are not sustained for long enough above the detect level threshold, the energization pulse ends before the motor reaches maximum speed, and the drive train decelerates toward a stop. If speech again rises above the detection threshold before the drive train stops, the motor is re-energized and again accelerates toward maximum speed. If the speaker talks rapidly enough, speech sounds will rapidly occur above the detection threshold, and the motor will be energized for a large proportion of the total time. This will keep the drive train running at near maximum speed to move the script paper 13 in pace with the rapid progress made by the speaker. If the speech slows down, the sounds above the detection threshold are less frequent, and motor 25 is energized for a smaller portion of the total time to move the script paper 13 at the slower rate of pace. The drive train including motor 25 thus provides an average speed as a function of the portion of the total time of a given interval that the energization occurs, and the energization is directly related to the speaker's pace.

The detection threshold for the speech of the speaker is preferably adjustable to tune the prompter to the style of each speaker, and the maximum speed of motor 25 is also preferably adjustable, so that after balancing the two adjustments, the inventive prompter will follow along faithfully at the speaker's pace automatically without manual intervention. The only time the speaker need interfere with this is for departures from the script for ad libs, questions, or other digressions. This is readily accomplished by an on/off switch 14 available to the speaker.

Figure 6:
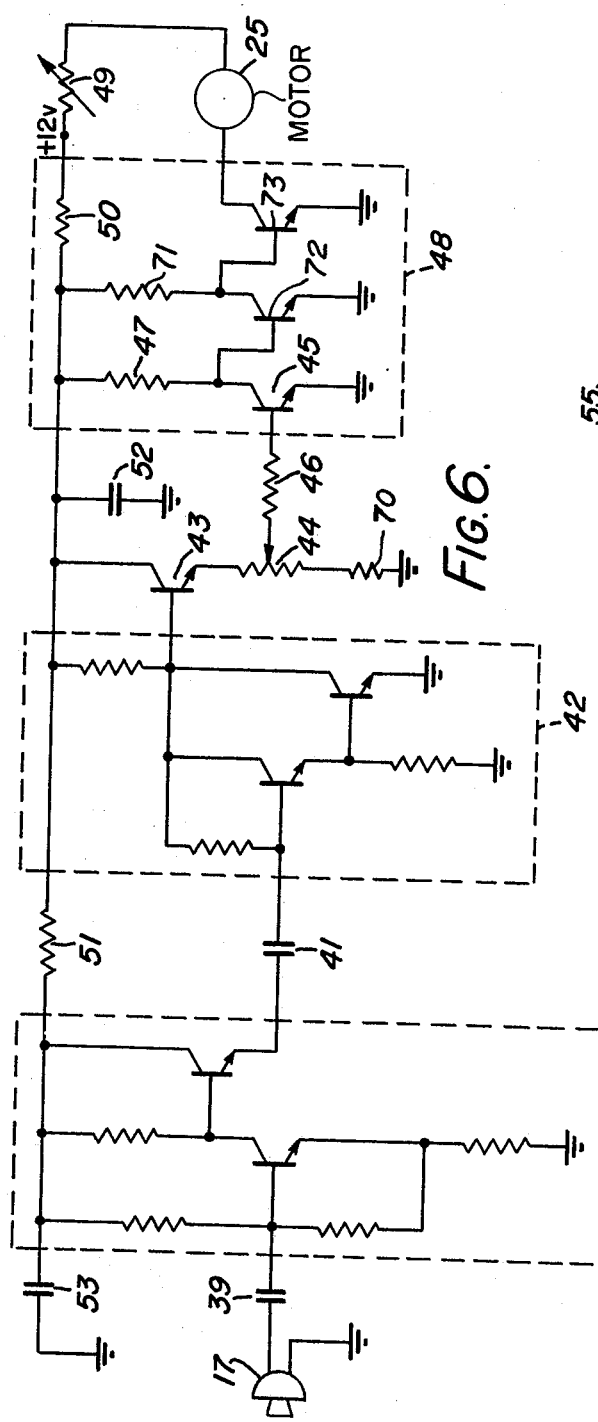
FIG. 6 is a schematic circuit diagram for the prompter of FIG. 1.

FIG. 6 shows one preferred example of many ways that circuitry for the inventive prompter can be structured. A preferably crystal microphone 17 converts accoustic energy to electrical energy, and capacitor 39 couples the microphone output to a first stage amplifier 40 and through coupling capacitor 41 to a second stage amplifier 42. The first amplifier stage 40 also provides an impedance match because its configuration has a high input impedance and a low output impedance. Second amplifier stage 42 is preferred to achieve sufficient voltage gain.

The output of amplifier stage 42 is applied to transistor 43 which is an emitter follower that is biased so that it also serves as a rectifier, because only positive-going voltages can be generated at its emitter. Potentiometer 44 adjusts the sensitivity of the threshold voltage by controlling the bias on transistor 45, and resistors 46 and 70 are current-limiting resistors. The adjustment of potentiometer 44 is preferably made by sensitivity adjustment knob 16 to control the threshold level for detecting the speaker's speech.

Switching circuit 48 includes resistor 47 and transistor 45 normally biased in a cut-off condition. When a voltage exceeding the threshold level occurs, transistor 45 switches to its saturated condition. In turn, resistor 71 and transistor 72 forming another switching stage that is normally saturated, is cut off. The switching stage formed by resistor 71 and transistor 72 is preferred to sharpen the threshold. Transistor 73 forms another switching stage within switching circuit 48 and is used to energize DC motor 25. Variable resistor 49 is peferably adjusted by control knob 15 of FIG. 1 to adjust the maximum speed of motor 25, and resistors 50 and 51 cooperate with capacitors 52 and 53 to form filter networks preferred to reduce noise in the system and to prevent oscillations.

Figure 7:
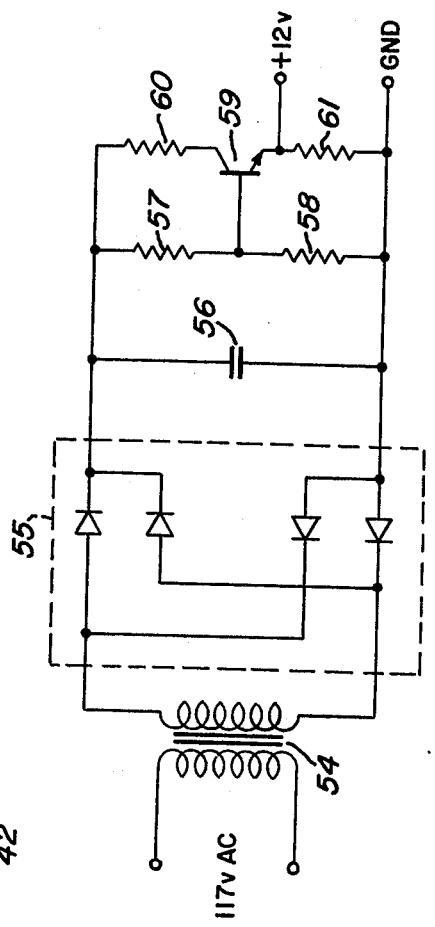
FIG. 7 is a schematic diagram of the power supply for the prompter of FIG. 1.

The power supply for the circuitry of FIG. 6 can be accomplished in many ways to achieve the desired 12 volts DC, including a battery power source. Many other power supply circuits are also possible, and the circuitry of FIG. 7 is one preferred example of a power supply for the circuitry of FIG. 6.

Transformer 54 converts 117v AC to a lower voltage that is rectified by full wave bridge rectifier 55. Capacitor 56 filters the output from rectifier 55 to eliminate the ripple, and resistors 57 and 58 form a voltage divider to provide the proper voltage at the base of transistor 59 which is in an emitter follower configuration to provide the regulation for the desired 12 volts. The regulated 12 volts is taken from the emitter of transistor 59 with reference to ground potential at the other side of resistor 61 which maintains a minimum current through transistor 59. Resistor 60 limits the output current to a predetermined level and protects transistor 59 from being destroyed by excessive current or short circuit.

The resulting circuitry produces pulses directly related to the speech of the speaker and can be adjusted to fit the speaker's voice. The pulses are integrated by the mechanical inertia of the drive train including motor 25, belt 26, a drive roller, and script paper 13 so that the script advances as a function of the duration and frequency of the energization pulses which in turn are related to the rate of the speaker's speech. The system is simple, fully adjustable, and once tuned to a speaker's style, advances the script automatically at a pace accurately matching the speaker's speed. Manual intervention or assistance from others is not required, and even though the inventive prompter is fully automatic and accurate, it is also simple and economical. It is compact and economical enough to be portable and find widespread use, and speakers can relatively carry it along and set it up quickly and easily at each place where a speech is to be given.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand the many paper drives, lighting arrangements, power supply circuits, and voice detecting circuits possible for use within the inventive concepts.

I claim:
1. An automatic prompter for speakers comprising:
   a. a housing having a window visible to the speaker;
   b. a supply zone area adapted to receive a script to be read by such speaker;
   c. feed mechanism for engaging and moving said script progressively across said window;
   d. take-up means for receiving said script after it has traversed said window;
   e. a motor for driving said feed mechanism;
   f. a microphone responsive to the speech of a speaker reading such script;
   g. electronic circuitry responsive to the output signals from said microphone for amplifying and detecting those signals representing speech above a predetermined threshold;
   h. and switching means, responsive to said electronic circuitry for energizing said drive motor whenever said speech is above said threshold, and for de-energizing said motor whenever said speech is below said threshold.

2. A prompter as claimed in claim 1 including a drive train connecting said motor with said feed mechanism, and wherein the motor armature, said drive train, and all other moving parts operated by said motor have a mechanical inertia producing an acceleration period at the beginning and end of each motor actuation of sufficient duration as to provide a variation in the average speed of said motor according to the rate at which the script is read by the speaker.

3. A prompter as claimed in claim 2 including a manual control for regulating the maximum speed of said motor.

4. A prompter as claimed in claim 1 wherein said microphone is directional so as to be more responsive to sounds from the speaker than to sounds emanating from other directions.

5. A prompter as claimed in claim 1 including a sensitivity control for adjusting the level of said threshold.

6. A prompter as claimed in claim 1 including a light for illuminating at least a portion of the script appearing in said window.

7. A prompter as claimed in claim 6 wherein said light more intensely illuminates a narrow central band across the script to identify the speaker's place.

8. An automatic prompter for speakers, comprising:
   a. a reading region, visible to a speaker;
   b. feeding means for advancing a prepared script progressively across said region at a speed corresponding to the normal reading rate of such speaker;
   c. a microphone responsive to the speech of such speaker;
   d. electronic circuitry responsive to said microphone for amplifying and detecting speech sounds above an established threshold; and
   e. switching means, responsive to said electronic circuitry for energizing said feeding means whenever said speech sounds are above said threshold, and for de-energizing said feeding means whenever said speech sounds are below said threshold.

9. An automatic prompter according to claim 8, including means for varying the average speed at which said feeding means operates as a function of the rate at which the script is read by the speaker.

10. An automatic prompter as claimed in claim 8 including means for identifying a narrow central band across the script to better identify the portion being read by the speaker.

* * * * *